United States Patent [19]
Means

[11] Patent Number: 4,847,897
[45] Date of Patent: Jul. 11, 1989

[54] ADAPTIVE EXPANDER FOR TELEPHONES
[75] Inventor: Donald R. Means, Indianapolis, Ind.
[73] Assignees: American Telephone and Telegraph Company, New York, N.Y.; AT&T Information Systems, Holmdel, N.J.
[21] Appl. No.: 131,610
[22] Filed: Dec. 11, 1987
[51] Int. Cl.[4] .............................................. H04M 1/60
[52] U.S. Cl. ..................................... 379/390; 381/94; 379/388
[58] Field of Search ................... 379/58, 60, 388, 389, 379/390, 387; 381/56, 57, 46, 71, 47, 94, 107, 113; 455/219, 221, 222, 225, 312

[56] References Cited
U.S. PATENT DOCUMENTS

| | | | |
|---|---|---|---|
| 3,889,059 | 6/1975 | Thompson et al. | |
| 3,963,868 | 6/1976 | Randmere et al. | |
| 4,076,968 | 2/1978 | Wattenbarger | |
| 4,461,025 | 7/1984 | Franklin | 381/56 |
| 4,475,232 | 10/1984 | Shaw | 381/94 |
| 4,506,381 | 3/1985 | Ono | 381/94 |
| 4,531,228 | 7/1985 | Noso et al. | 381/46 |
| 4,609,878 | 9/1986 | Rodgers | 330/136 |
| 4,628,529 | 12/1986 | Borth et al. | 381/94 |
| 4,630,304 | 12/1986 | Borth et al. | 381/94 |
| 4,696,032 | 9/1987 | Levy | 381/113 |

FOREIGN PATENT DOCUMENTS 0020088  2/1982  Japan ..................................... 381/57

Primary Examiner—Jin F. Ng
Assistant Examiner—Randall S. Vaas
Attorney, Agent, or Firm—Michael A. Morra

[57] ABSTRACT

An adaptive expander for telephones reduces the gain of a transmitting amplifier in proportion to the intensity of the background noise. Gain reduction occurs when the user is not speaking into the handset microphone. When the user is speaking, however, the gain of the transmitting amplifier is restored to its normal level. Noise is distinguished from speech via long-term averaging of the microphone output signal, and a circuit that precludes the magnitude of the long-term average voltage from ever exceeding the short-term average voltage. The present invention is used in full duplex arrangements where simultaneous transmission in both directions is possible rather than in half duplex arrangements, such as a speakerphone, where transmission occurs only in one direction at a time.

5 Claims, 2 Drawing Sheets

ADAPTIVE EXPANDER FOR TELEPHONES

TECHNICAL FIELD

This invention generally relates to telephone station circuits, and more particularly to background noise suppression.

BACKGROUND OF THE INVENTION

The microphone of a telephone handset responds to both speech signals and to background noise. Such background noise is disturbing not only to the local user but also to a distant party involved in a telephone conversation with the local user. Telephone stations are generally arranged to provide a certain amount of feedback so that conversations sound normal, even though one ear is obviously blocked from receiving the user's voice signals transmitted though the air. Such feedback is known as "sidetone;" and, although sidetone is useful when the user is speaking, it is annoying at a location where background noise is particularly high and the user is only listening. For example, in an effort to hear the conversation, the user may place her hand over one ear to block out room noise - only to have it enter her other ear via the handset microphone and sidetone path. Background noise is particularly offensive during a conference call in which each conferee is exposed to the combined background noise of all conferees.

In some cases, signal-to-noise ratio has been improved through the use of an expander circuit having two gain levels. In the absence of a strong speech signal into the microphone, the gain of the transmitting amplifier is set to its minimum level and thus reduces the noise transmitted to the receiver. When a strong speech signal is detected, the gain of the transmitting amplifier is set to its maximum level so that the speech signal is transmitted to the distant party at the proper level. Such expanders perform reasonably well so long as the user speaks directly into the microphone; however, many users do not, and even make matters worse by positioning the mouthpiece under their chin. In such cases, there may not be sufficient speech energy reaching the microphone to cause the expander to switch properly. Although the switching threshold can be lowered, such lowering decreases the margin against switching due to background noise.

In U.S. Pat. No. 3,889,059 the ambient noise level is used to proportionally decrease the transmitted speech signal level. Although this compensates for the natural tendency of a user to speak more loudly in a noisy environment than in a quiet environment and results in a more constant speech signal level being presented to the transmission facility, it does not address the problem of the transmission of background noise at the location where the user is merely listening.

U.S. Pat. No. 3,963,868 discloses the use of a noise guard circuit whose output is added with the transmit and receive signals so as to prevent ambient noise from influencing the enabled direction of transmission. This particular use of ambient noise measuring equipment is useful in a speakerphone application but, once again, does not address the problem of transmitting ambient noise in a full duplex environment when the local user is listening.

It is therefore an object of the present invention to minimize the transmission of background noise picked up by a telephone handset microphone during the time that the user of the handset is not speaking.

It is another object of the present invention to provide effective expander action when the user is not speaking directly into the microphone.

SUMMARY OF THE INVENTION

The performance of a conventional telephone station operating in a full duplex mode and in a noisy environment is improved by an adaptive expander. In the absence of a strong speech signal into the microphone, the expander reduces the gain of the transmitting amplifier in proportion to the level of background noise, thereby reducing the noise transmitted to the receiver via the sidetone path, and to the distant party. When a strong speech signal is detected, the expander raises the gain of the transmitting amplifier back to its normal level so that the speech signal is transmitted to the distant party at the proper level. Background noise is distinguished from a speech signal by the time-averaged characteristic of the electrical signal that emanates from the microphone.

It is therefore a feature of the present invention that expander action is obtained in proportion to the need for expander action. Accordingly, in a quiet environment it is not important that the user speak directly into the microphone.

These and other objects and features of the present invention will be more fully understood when reference is made to the accompanying drawings and detailed description of the invention.

DETAILED DESCRIPTION

Figure 1:
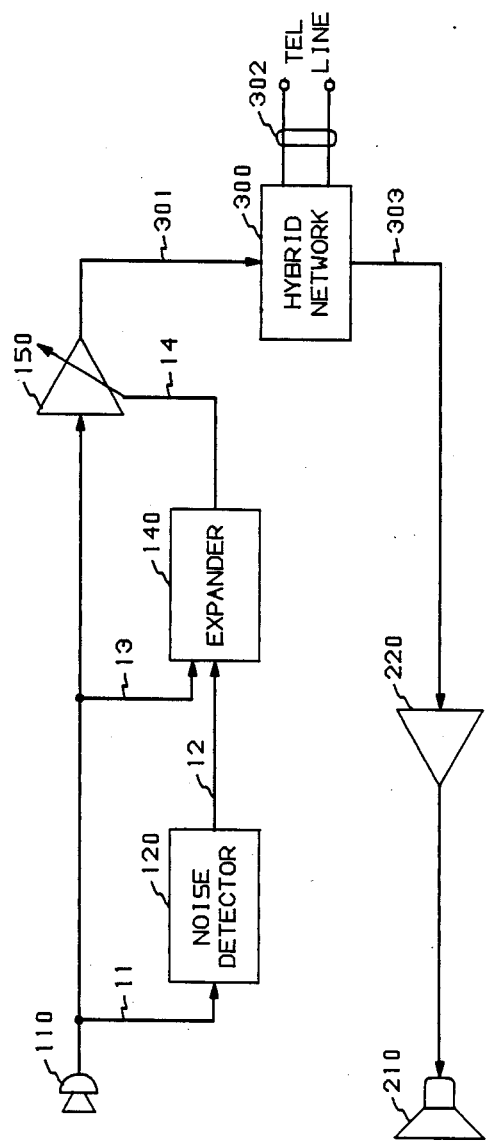
FIG. 1 is a block diagram illustrating an adaptive expander for telephone applications in accordance with the present invention.

FIG. 1 discloses a block diagram implementation of the present invention. Microphone 110 and loudspeaker 210 are, for example, part of a conventional telephone handset. Signals emanating from microphone 110 are amplified by transmitting amplifier 150 for delivery to telephone line 302 by way of hybrid network 300. Hybrid network 300 is a 4-wire to 2-wire converter that operates to transmit signals present on leads 301 onto telephone line 302. Additionally, hybrid network 300 routes incoming signals from telephone line 302 to leads 303. Further, hybrid network 300 is designed to allow a certain amount of signal energy present on leads 301 to pass directly to leads 303 and thereby provide the user with feedback on the intensity of his speech. Such sidetone is delivered to the user via receive amplifier 220 and loudspeaker 210.

Noise detector 120 responds to the output electrical signals of microphone 110 to provide a DC voltage proportional to the average background noise level. Noise detector 120 is also arranged to ignore speech signals.

Figure 2:
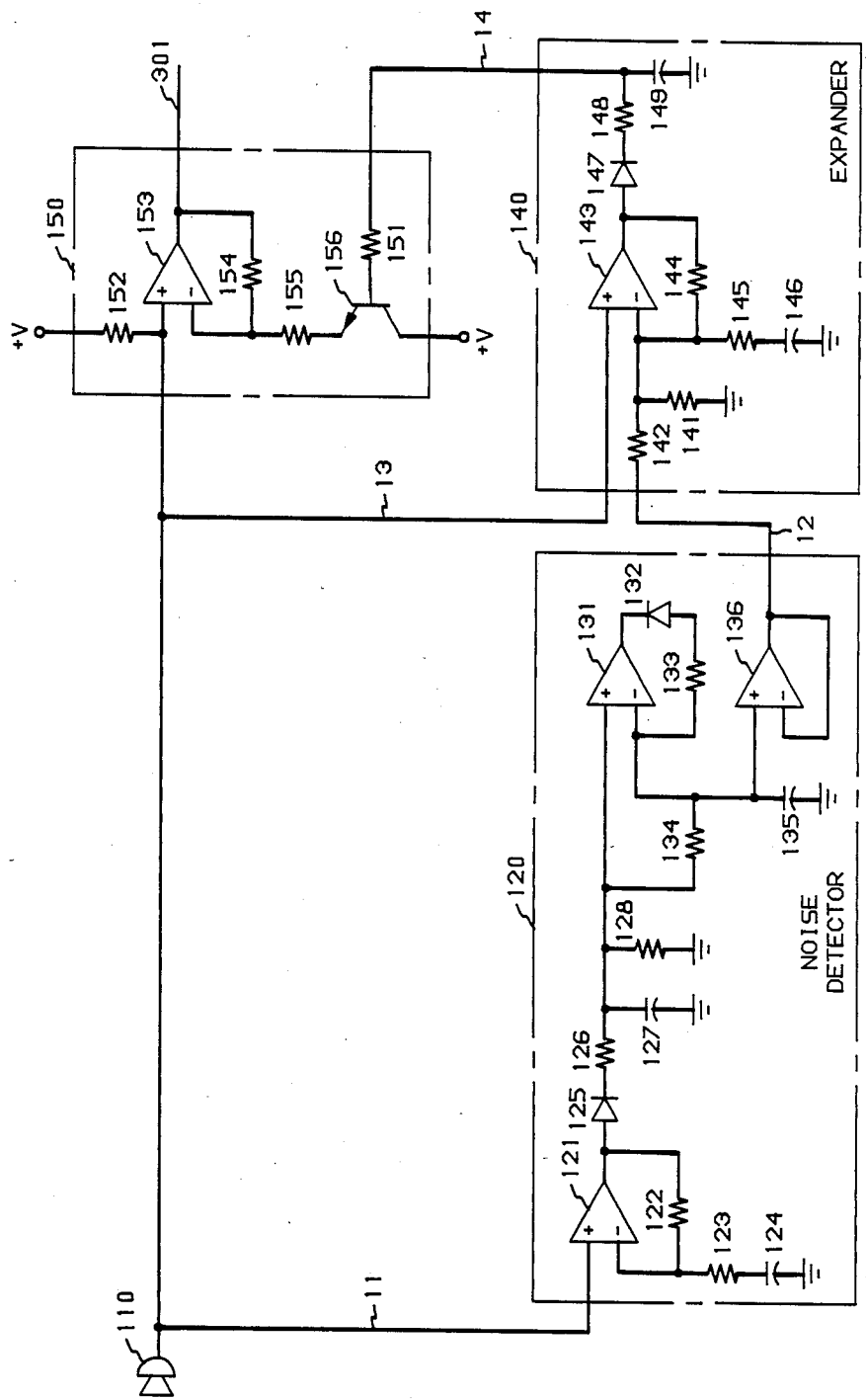
FIG. 2 is a schematic diagram of a preferred embodiment of the invention.

FIG. 2 provides a more detailed schematic of the significant portions of a telephone incorporating the present invention. Many specific details concerning the telephone, such as its hybrid circuit, have not been included since they are known in the art, would complicate the disclosure, and would obscure the novel points of the adaptive expander. It will also be appreciated however that many of the specific details that are included explain the novel features and are not specifically necessary to practice the disclosed inventive concepts.

In FIG. 2, noise detector 120 comprises components 121-136. Comparator 121 provides decoupling of the noise detector circuit from microphone 110 while amplifying the electrical signal presented to its non-inverting input on lead 11. Capacitor 124 operates to set the DC voltage at the inverting input to comparator 121 equal to the DC voltage present on the non-inverting input on lead 11. Diode 125 provides half-wave rectification of the signals emanating from comparator 121. Resistor 126 is small compared to resistor 128 and consequently capacitor 127 charges rapidly. The time constant provided by capacitor 127 and resistor 128 is approximately 50 milliseconds which enables it to follow the envelope of a speech signal. Resistor 134 and capacitor 135 however form a much longer time constant (approximately 4 seconds) for the averaging of a noise signal. Amplifier 131 together with diode 132 and resistor 133 are used to immediately discharge capacitor 135 whenever the input signal envelope is below the voltage on capacitor 135. It is noted that normal speech energy is seldom continuous for more than 4 seconds, and that breaks in speech usually exceed 50 milliseconds. Such speech characteristics are advantageously used to distinguish speech from background noise in noise detector 120. Thus, by rapidly discharging capacitor 135 to a lower voltage whenever a high intensity signal envelope abates for more than 50 milliseconds, the capacitor effectively ignores the speech signal while continuing to follow the background noise signal.

Amplifier 136 buffers the voltage on capacitor 135 whose magnitude is proportional to the level of the background noise. Resistors 141 and 142 operate as a voltage divider used to set a threshold voltage for amplifier 143. The DC voltage into the inverting input of amplifier 143 represents the magnitude of the noise level, which, if speech is absent on the non-inverting input (lead 13), ultimately controls the emitter-to-collector impedance of transistor 156 thereby regulating the gain of transmitting amplifier 150. A speech signal present on the non-inverting input to amplifier 143 (lead 13) overcomes the bias voltage present on the inverting input, is rectified by diode 147, and its DC average value is stored on capacitor 149. When speech is present, the magnitude of the voltage on capacitor 149 is sufficient to saturate transistor 156 which is used in a "reverse beta" configuration. Accordingly, the gain of amplifier 153 is maximized and substantially set by the ratio of resistors 154 and 155. The time constant of resistor 148 and capacitor 149 is approximately 2 milliseconds and selected to minimize speech clipping. Resistor 152 is returned to the same DC voltage level as the collector of transistor 156 so that the DC voltage difference between the input leads of amplifier 153 is zero. The gain of amplifier 153 is in its maximum gain state when a speech signal is present, and is reduced in proportion to the magnitude of the DC voltage on lead 12 when a speech signal is not present. The voltage on lead 12 is nominally a 4-second average of the magnitude of the output electrical signal from microphone 110.

What is claimed is:

1. In a telephone station having a microphone for converting audible sounds into output electrical signals and a transmitting amplifier for amplifying said output electrical signals, an expander for regulating the gain of the transmitting amplifier including:

means responsive to a short-term average of the output electrical signals for generating a first DC voltage proportional thereto;

means responsive to a long-term average of the output electrical signals for generating a second DC voltage proportional thereto;

means for comparing the relative magnitudes of said first and second DC voltages;

means for setting the gain of the transmitting amplifier to its maximum level when the magnitude of the first DC voltage exceeds the magnitude of the second DC voltage; and means for decreasing the gain of the transmitting amplifier from its maximum level by an amount proportional to the magnitude of the second DC voltage.

2. The telephone station of claim 1 wherein the first DC voltage is generated by:

means for rectifying the output electrical signal from the microphone; and first filter means, including a resistor-capacitor circuit having a time constant less than 200 milliseconds, for filtering said rectified signal.

3. The telephone station of claim 2 wherein the second DC voltage is generated by second filter means, including a resistor-capacitor circuit having a time constant greater than 1 second, for filtering said first DC voltage.

4. In a telephone station having a handset that includes a microphone for converting audible sounds into output electrical signals and a transmitting amplifier for amplifying said output electrical signals, a method for controlling the gain of the transmitting amplifier comprising the steps of:

measuring the long-term average voltage of the output electrical signals from the microphone;

measuring the short-term average voltage of the output electrical signals from the microphone;

comparing said long-term and short-term average voltages;

setting the transmitting amplifier to its maximum gain condition when the short-term average voltage exceeds the long-term average voltage; and decreasing the gain of the transmitting amplifier from its maximum gain condition by an amount proportional to the magnitude of said long-term average voltage.

5. The method of claim 4 wherein the step of measuring the long-term average voltage comprises the steps of:

averaging the magnitude of the output electrical signals from the microphone over a time interval less than 200 milliseconds to form a first DC voltage;

averaging the magnitude of the first DC voltage over a time interval greater than one second to form a second DC voltage; and decreasing the magnitude of the second DC voltage to the level of the first DC voltage whenever its magnitude is greater.

* * * * *